Figure 1B:
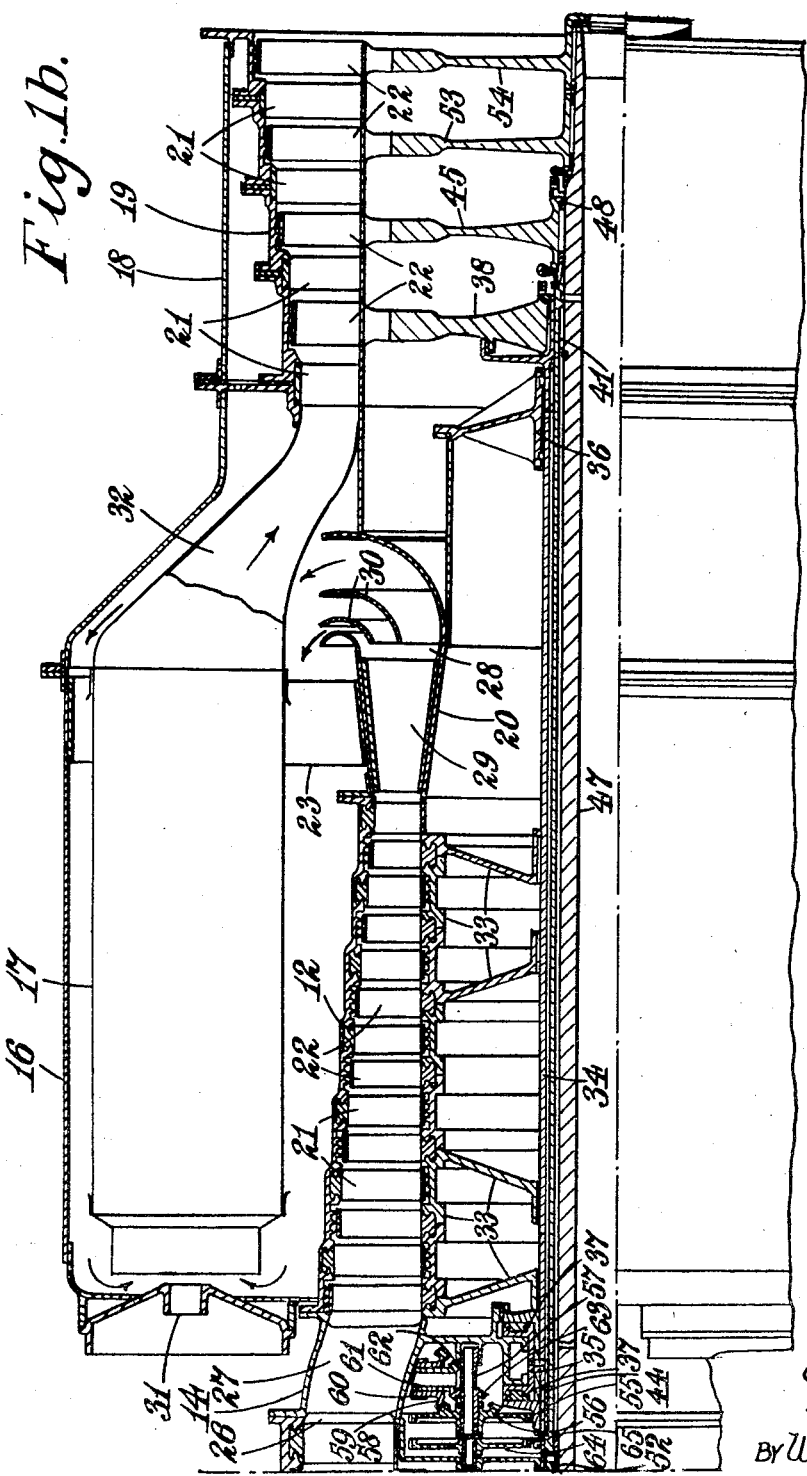

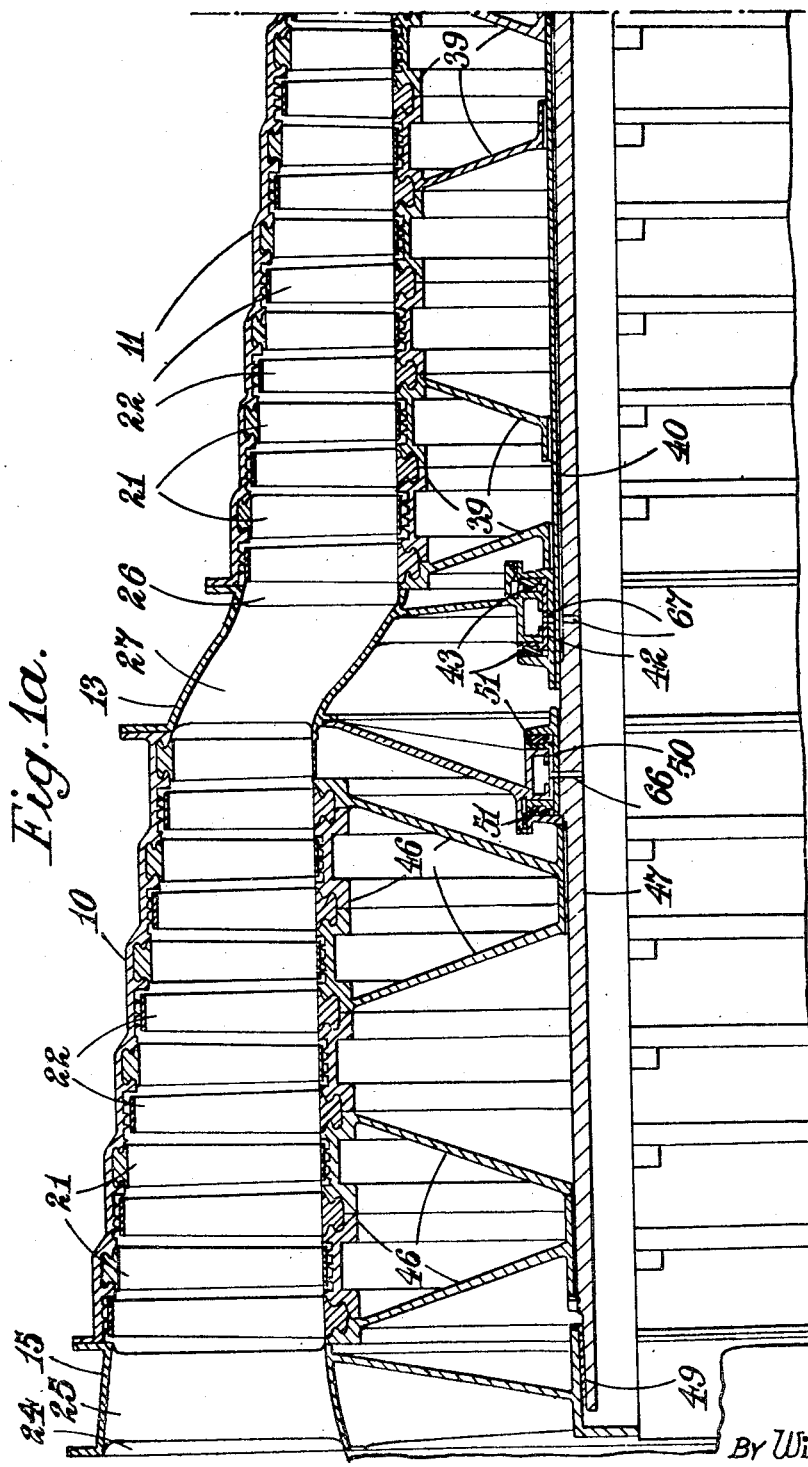

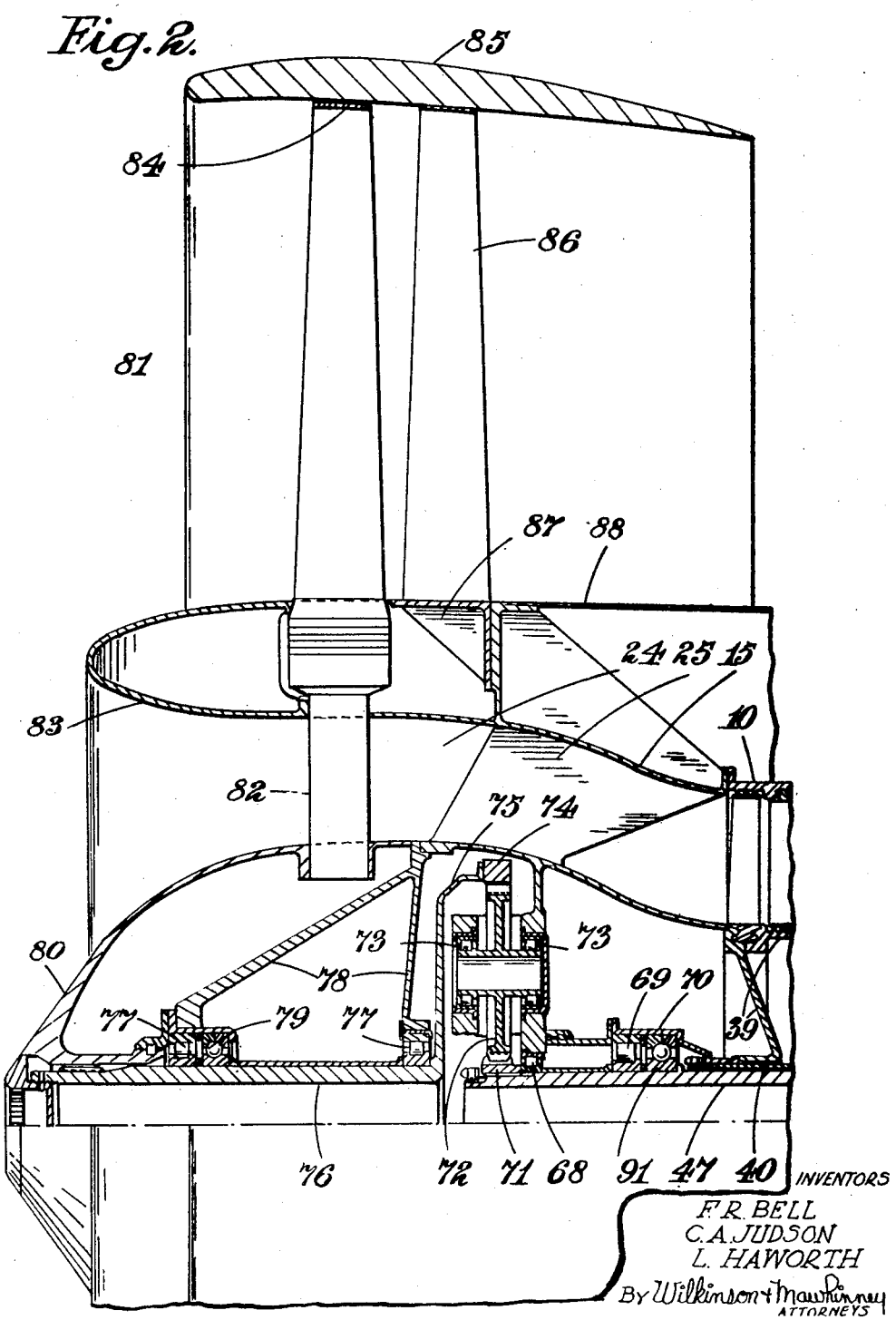

Patented Nov. 7, 1950

2,528,635

UNITED STATES PATENT OFFICE 2,528,635

POWER GAS GENERATOR FOR INTERNAL-COMBUSTION POWER UNITS

Frank Robert Bell, Derby, Charles Alan Judson, Borrowash, near Derby, and Lionel Haworth, Derby, England, assignors to Rolls-Royce Limited, Derby, England, a British company Application August 5, 1946, Serial No. 688,514
In Great Britain June 22, 1943

Section 1, Public Law 690, August 8, 1946
Patent expires June 22, 1963

6 Claims. (Cl. 230—116)

It is known that turbines can be driven by steam, or a gas which is supplied at a temperature and pressure higher than the temperature and pressure prevailing at the outlet from the turbine, and it is known to provide such a working fluid by compressing air or other gas in a suitable compressor or compressors, heating it at the high pressure by burning fuel in it in a combustion chamber, and expanding the heated products of combustion through a turbine or turbines, which are used to drive the compressor or compressors; units for this purpose are for brevity designed in this specification as power-gas-generators.

In a suitably designed power-gas-generator, the residual pressure and temperature at the final outlet will be considerably above atmospheric pressure and temperature so that the motive fluid still has available in it energy which may be used to drive further turbines (herein designated power-turbines, since they can provide a mechanical power supply), or the exhaust gases from the power-gas-generator may be used for effecting jet-propulsion in an aircraft. It is also possible in suitably designed installations to use the exhaust from the power-turbines for jet propulsion, giving a thrust additional to that derived from a propeller driven by the power-turbines.

It has been proposed to provide a power-gas-generator of this kind with two independently rotatable coaxial nested shafts, the inner one extending out from the ends of the outer one, two compressors arranged in series and grouped together, mounted one on each shaft near the front end thereof, a turbine on each shaft near the rear end thereof, a fixed main bearing for each shaft supporting the compressor end thereof, a second fixed main bearing for the outer shaft between its compressor and its turbine and a second fixed main bearing for the inner shaft supporting it rearwardly of the turbine it carries. An object of this invention is to avoid the use of a bearing for the inner shaft rearwardly of the turbine it carries.

According to the present invention a power-gas-generator of the kind described comprising the combination of a plurality of independently rotatable coaxial nested shafts, each inner one extending out from the ends of the shaft outside it, a plurality of compressors arranged in series and grouped together, mounted one on each shaft near one end thereof, a turbine on each shaft at the other end thereof, a fixed main bearing for each shaft supporting the compressor-end thereof, a second fixed main bearing for the outermost shaft between its compressor and its turbine is characterised by the provision of a bearing at the turbine-end of each inner shaft between it and the shaft outside it.

Preferably, each of the inner shafts of the plurality is provided with a second fixed bearing supporting it between its compressors and the adjacent end of the next outer shaft, and there may also be provided at the compressor-end of each shaft, a suitable thrust bearing to effect the axial location of the shaft and parts carried by it.

According to another feature of this invention each of the inner shafts may be provided with additional bearings or bushes suitably spaced along that part of the length of the shaft which is enclosed by the next outer shaft to provide additional support if required from such next outer shaft.

According to another feature of this invention there is provided in a power-gas-generator, the combination with one or more of the coaxial shafts, of a gear connection at the compressor-end thereof to provide a drive from the shaft for any auxiliaries; such connection may also be used for starting the unit, and for that purpose there is preferably provided a gear connection on several of the shafts so that they can all be driven simultaneously at their appropriate speeds.

The arrangement of compressors and turbines according to this invention as described above lends itself to a compact construction of power-gas-generator, and according to another feature of this invention, therefore, such a power-gas-generator comprises axial-flow compressors and turbines arranged with the large-diameter first-stage compressor at one end of the unit and a smaller diameter high-pressure compressor between the ends of the unit, with a combustion chamber or chambers disposed in the annular space around the high-pressure compressor, such combustion chambers preferably lying within the overall diameter of the low-pressure compressor. When such a compressor is used in the power unit of an aircraft, it is, according to another feature of this invention, arranged with its longitudinal axis in the direction of flight, with the air-intake to the first-stage compressor forwardly directed, and the final outlet of the exhaust gases rearwardly directed.

According to yet another feature of this invention, the exhaust gases may be used for jet-propulsion of an aircraft, or alternatively, or additionally, there may be provided a power turbine mounted co-axially with the power-gas-generator on a shaft extending through the generator shafts, and a fan or propeller driven from the forward end of said shaft, by means of a suitable reduction gear.

Alternatively, the power turbine shaft may extend in a reaward direction to the reduction gear to drive the fan or propeller which would then be behind the engine.

According to another feature of this invention, lubrication is effected by a supply of oil to the forward end of the innermost shaft, each of the shafts being provided with suitable apertures spaced along it to allow the oil to pass outwards to the bearings of the other shafts.

Two embodiments of the present invention will now be described, by way of example only, with reference to the accompanying drawings in which:

Figures 1A and 1B together constitute a longitudinal half-section through a power-gas-generator forming part of an internal-combustion turbine or jet-propulsion unit, and Figure 2 is a longitudinal half-section through a fan unit and part of an internal-combustion turbine unit incorporating the present invention and illustrates the manner in which the fan is driven by the turbine.

In the construction shown in Figures 1A and 1B, the outer casing 10, 11 and 12 of a low-pressure compressor, an intermediate-pressure compressor and a high-pressure compressor, respectively, are bolted or otherwise secured together with panels 13 and 14 secured between them and a third panel 15 secured to the forward or intake end of the unit. The high-pressure compressor casing 12 (see Figure 1B) is surrounded by a casing 16 which encloses a number of combustion chambers 17 and merges rearwardly into a casing 18 of reduced diameter. The casing 19 of a four-stage turbine is secured in the casing 18 and the axial space between the high-pressure compressor and the turbine is filled by an internal casing 20 which is secured to the rear end of the casing 12 of the high-pressure compressor and suitably supported from the casing 16 by supports 23. The structure described so far constitutes the carcase of the unit and is mounted in an aircraft with its left-hand end as seen in the drawings facing forwardly.

The compressors and turbines are of the axial flow type and each comprises fixed shrouded-rings of blades 21 and rotatable shrouded-rings of blades 22. The panel 15 is formed with an annular air intake 24 which is crossed by radial struts 25 that secure the inner and outer parts of the panel together and the panels 13 and 14 are similarly formed with annular transfer passages 26 crossed by struts 27. Air entering the unit at its forward end through the intake 24 is thus compressed and delivered rearward'y into a transfer passage 28 formed in the internal casing 20 of which the inner and outer parts are secured together by struts 29 crossing the passage 28. The rear end of the passage 28 is curved outwardly and provided with guide rings 30 so that the compressed air is delivered radially outwardly into the casing 16 and flows forwardly through that casing to enter the combustion chambers 17 which are open at their forward end, and flow rearwardly through them as indicated by the arrows in Figure 1B. The combustion chambers 17 are equally spaced around the chamber 16 and liquid fuel is injected into each of them by an injection nozzle, not shown, that is mounted in an opening 31 and directs the fuel through the open forward end of the combustion chamber. Provision, not shown, is made for admitting secondary air into each combustion chamber through its side walls to ensure complete combustion and the combustion products flow rearwardly from each combustion chamber through a passage 32 to the intake of the turbine.

The exhaust from the turbine may either be discharged as a jet for jet propulsion of the aircraft or, alternatively or additionally, they may be expanded through an additional turbine driving a propeller or fan to propel the aircraft.

The rotatable rings of blade 22 of the high-pressure compressor are secured on a compressor drum 33 mounted on a tubular shaft 34 which is rotatably mounted at its front end in a journal bearing 35 in the panel 14 and near its rear end in a journal bearing 36 carried by the internal casing 20 and is located axially at its front end by thrust bearings 37 carried by the panel 14. The rear end of the shaft 34 overhangs the bearing 36 and the first-stage rotor 38 of the turbine is secured on the overhanging end. The first stage of the turbine thus drives the high-pressure compressor.

The rotatable blades of the intermediate compressor are carried by a compressor drum 39 mounted on a second tubular shaft 40 that is nested within the shaft 34 and is journalled at 41 in the rear end of the shaft 34. The front end of the shaft 40 is mounted in a journal bearing 42 in the panel 13 and thrust bearing 43 in this panel locate the shaft axially. An intermediate bearing 44 is provided between the shafts 34 and 40. The rotor 45 of the second stage of the turbine is secured on the rear end of the shaft 40 which projects as shown from the shaft 34 so that the intermediate-pressure compressor is driven by the second turbine stage.

The rotatable blades of the low-pressure compressor are carried by a compressor drum 46 mounted on a tubular shaft 47 that is journalled near its rear end at 48 in the rear end of the shaft 40 and at its front end in a bearing 49 in the panel 15. The shaft 47 is also supported by a journal bearing 50 in the panel 13 and thrust bearing 51 in this panel locates the shaft axially. A journal bearing 52 is also provided between the shafts 40 and 47. The rotors 53 and 54 of the last two turbine stages are secured on the rear end of the shaft 47 so that these stages drive the low-pressure compressor.

The first stage, the second stage and the third and fourth stages of the turbine operate independently as separate turbines each to drive a separate compressor at a speed independent of that of the other compressors. This makes it possible to limit the number of stages and the compression ratio of each compressor so as to facilitate starting without limiting the overall compression-ratio, and also to give a wide speed range to the unit without the risk of stalling or a loss of efficiency of the compressors. Also the various compressor- and turbine-blades can be designed independently, each to be appropriate to its own functions.

It will be seen that with the above-described arrangement, adequate bearings can readily be accommodated, and moreover, they are spaced apart substantially at the ends of the shafts so that gyroscopic loads are adequately catered for, and the risk of wobbling of the turbine discs or compressor drums is substantially eliminated; it thereby follows that sealing of the various stages is simplified and close clearances are possible to minimise inter-stage leakage.

Preferably, all the shafts rotate in the same direction so that with the arrangement of bearings above described, either plain or anti-friction bearings may be used as desired, without the necessity of close clearance or pre-loading, whilst still maintaining smooth and true rotation of the shafts. If it is desired, additional support may be provided between each shaft and the shaft inside it by means of bushes or bearings interposed between them. As described above, all the turbine rotors are overhung from their shafts and normally no bearings are needed aft of the last turbine rotor in the hot exhaust space. If desired, however, such a bearing may be provided for the longest shaft and fixed bearings may be provided at the after end of each shaft between the various turbine rotors, such bearings being supported from the turbine stators. In this case it would be possible to avoid the provision of bearings between the shafts themselves, but the arrangement first described is preferred.

The shaft 34 has a gear wheel 55 (Figure 1B) secured on its forward end to mesh with a gear wheel 56 that is rotatable on a shaft 57 and is integral with a bevel wheel 58. The bevel wheel 58 meshes with a bevel wheel 59 that is secured on a shaft 60 that is mounted in the panel 14 to extend radially from the unit. The shaft 60 is thus driven by the shaft 34 and drives any auxiliaries that may be required in connection with the plant. The unit may be started by clutching the shaft 60 to a suitable starting motor which then drives the shaft 34 and the high-pressure compressor. The starting motor is also clutched by a separate clutch to a shaft 61 which is nested within the shaft 60 and carries a bevel wheel 62 that meshes with a bevel wheel 63 secured on the shaft 57. This shaft carries a gear wheel 64 that meshes with a gear wheel 65 on the shaft 40 so that the starting motor will also drive the shaft 40 and the intermediate-pressure compressor. These two compressors are thus geared together and both driven through separate clutches while the unit is being started but run independently when they have been de-clutched from the starting motor. A similar geared drive may be provided between the starting motor and the shaft 47 so that the low-pressure compressor may also be driven when the unit is started.

Lubrication is effected by feeding oil through a suitable conduit into the shaft 47 through its forward end and the oil is distributed from this shaft by centrifugal action to the various bearings through suitable apertures such as the aperture 66 for the bearing 50 and the apertures 67 for the bearings 42 and 43 (Figure 1A).

It will be observed that the casing 16 enclosing the combustion chambers is of smaller diameter than the panel 15 accommodating the air intake 24 and this is made possible by mounting it around the high pressure compressor which is of relatively small diameter. This disposition of the combustion chambers and their enclosing casing 16 reduces the length of the unit, without, however, increasing its overall diameter which is determined by the size of the air intake 24. This arrangement involves a reversal of the flow of the compressed air as it flows from the passage 28 into the casing 16. The reversal of direction of flow which takes place at this point to enable air to enter the combustion chambers involves a smaller loss for similar flow velocities than if such reversal took place before compression, because in the latter case the final pressure loss is proportional to the pressure-ratio of the compressors, while in the former it is only proportional to the density-ratio of compression. The density-ratio is lower than the pressure-ratio because of the increase in temperature of the air during compression. Moreover, for similar flow velocities the bends are smaller and more easily accommodated when they deal with the dense air after compression. From the combustion chambers the air after being heated continues its direct rearward flow through the turbines and may be finally discharged through a suitable jet if the unit is used for jet-propulsion.

The exhaust gases from the turbine of the unit may also be fed to the intake of an additional power turbine mounted to the rear of the unit and coaxially therewith. This power turbine may drive a propeller or fan at the rear of the power unit through a suitable reduction gear or the propeller or fan may be at the front of the power plant and driven by a shaft extending through the innermost compressor shaft. The manner in which the construction shown in Figures 1A and 1B may be modified to provide a power plant in accordance with this last alternative will now be explained.

The low-pressure compressor is omitted so that the intermediate-pressure compressor becomes the low-pressure compressor and is driven by the second stage rotor 45 of the turbine through the shaft 40. The rotors 53 and 54 constitute a two-stage power turbine which through the shaft 47 drives a fan through a reduction gear as will be explained later with reference to Figure 2. The bearings 42 and 43 for the shaft 40 are shifted from the position shown in Figure 1A to a position immediately to the rear of the low-pressure compressor drum 39 and between that drum and the gear wheels 64 and 65 to its rear, the axial dimension of the panel 14 being increased to accommodate this. The panel 13 is omitted.

As shown in Figure 2, the forward end of the shaft 47 is mounted in a roller bearing 68 carried by the panel 15 in the forward end of the low-pressure compressor and the forward end of the shaft 40 is supported by a roller bearing 69 between an extension 70 of the shaft 40 and the shaft 47. The shafts 40 and 47 are located axially of one another by a thrust ball-bearing 91 which transmits the axial load on the shaft 47 to the shaft 40 whence it is transmitted through the bearing 43 to the carcase of the unit.

The shaft 47 carries a pinion 71 that meshes with a gear wheel 72 rotatable in bearings 73 in the panel 15. The gear wheel 72 meshes with an internal gear ring 74 secured to a flange 75 on the end of a shaft 76. This shaft is mounted in roller bearings 77 in an extension 78 of the panel 15 and the axial load of the shaft is taken by a thrust ball-bearing 79. Three, or other number, of gear wheels 72 may be arranged around the shaft 47 so that the load is divided between them and the reactions of the gear train on the shaft are balanced.

An inner spinner 80 is mounted on the forward end of the shaft 76 and defines the inner face of the forward part of the annular air intake 24. A number of fan blades 81 (only one being shown) are secured at the inner ends of their roots 82 to the inner spinner 80 and an annular outer spinner 83 is secured to the blades at the outer ends of their roots 82 so that it is supported from the inner spinner 80 by the blade-roots 82. The outer ends of the blades 81 are connected together by a shroud-ring 84 and the fan rotates in a tunnel provided by a ring 85 of airfoil section which is mounted on the panel 15 by means of struts 86 (only one is shown) and a ring 87 secured to the panel. The outer spinner 83 defines the inner face of the entrance to the tunnel and the outer face of the entrance to the air intake 24. The power unit is enclosed in a suitable casing 88 over which the air from the fan flows.

Whilst it is advantageous that the compressors and turbines of the unit should all rotate in the same direction, so that the relative speed of the shafts is reduced to a minimum, they can, if desired, be made to rotate alternately in opposite directions, so that the use of stators for the various turbines is avoided. In this case, however, the intermediate bearings between the shafts will be required to operate at the sum of the speeds of the two shafts with which they are associated, instead of their difference.

Whilst the invention has been described in detail as applied to a power unit for an aircraft giving either jet-propulsion alone, or a drive by a propeller assisted by jet-propulsion, it will be appreciated that it is not limited to this particular purpose, since the power available in the exhaust gas delivered by the power-gas-generator may be converted to mechanical power with a power-turbine-stage or stages and used as a mechanical drive for any purpose, such as for driving electric generators, or marine propellers or the wheels of rail or road transport.

We claim:

1. A power-gas generator of the kind comprising a plurality of independently-rotatable coaxial nested shafts each inner shaft extending out from the ends of the shafts outside it, a plurality of compressor rotors arranged in series and grouped together mounted one on each shaft near one end thereof, a turbine rotor secured to each shaft at the other end thereof, a casing structure enclosing said shafts, compressor rotors and turbine rotors, bearing means for supporting each shaft from the casing structure located solely on the side of the turbine rotor facing towards the associated compressor rotor and comprising a journal bearing between the compressor end of each shaft and the casing structure, a journal bearing supporting the outermost shaft from casing structure and located between the compressor rotor and turbine rotor carried by the outermost shaft, and journal bearing means between each inner shaft and the turbine end of the shaft next outside it.

2. A power-gas generator as claimed in claim 1, wherein the bearing means supporting the shafts from the casing structure also comprises for each inner shaft a journal bearing between the casing structure and the part of said shaft between its compressor rotor and the adjacent end of the next outer shaft.

3. A power-gas generator as claimed in claim 2, comprising also for each shaft a thrust bearing between the shaft and the casing structure to locate the shaft axially within the casing structure, said thrust bearing being positioned adjacent the compressor on the shaft.

4. A power-gas generator as claimed in claim 1, wherein the casing structure comprises a stator casing for each compressor rotor, an intermediate panel member interconnecting each stator casing with the next adjacent stator casing and extending inwardly between the associated compressor rotors to adjacent the compressor end of one of the shafts carrying the said compressor rotors, a panel member secured to the free end of the stator casing associated with the compressor rotor carried by the innermost shaft, an internal casing supported from the free end of the stator casing associated with the compressor rotor of the outermost shaft and a turbine casing supported from the stator casings, and said bearing means for supporting the shafts from the casing structure comprises a journal bearing carried by the end panel member and supporting the innermost shaft, a journal bearing carried by each intermediate panel member and supporting the compressor end of the shaft towards which the intermediate panel member extends, and a journal bearing carried by the internal casing and supporting the outermost shaft between its associated compressor rotor and turbine rotor, said turbine casing being free from shaft supporting bearings.

5. A power-gas turbine as claimed in claim 4, wherein the bearing means for supporting the shafts from the casing structure also comprises a journal bearing carried by each intermediate panel member and supporting an inner shaft between its associated compressor rotor and turbine rotor.

6. A power-gas turbine as claimed in claim 5, comprising also thrust bearing means for each shaft carried by said intermediate panel members.

FRANK ROBERT BELL.
CHARLES ALAN JUDSON.
LIONEL HAWORTH.

REFERENCES CITED

The following references are of record in the file of this patent:

UNITED STATES PATENTS

| Number | Name | Date |
|---|---|---|
| 2,430,398 | Heppner | Nov. 4, 1947 |
| 2,430,399 | Heppner | Nov. 4, 1947 |

FOREIGN PATENTS

| Number | Country | Date |
|---|---|---|
| 411,472 | France | Apr. 12, 1910 |